United States Patent [19]
Pineau

[11] 3,738,633
[45] June 12, 1973

[54] SHOCK AND VIBRATION DAMPER

[76] Inventor: André Lucien Pineau, 12 Rue de Bearn, 92 Saint-Cloud, France

[22] Filed: Jan. 26, 1971

[21] Appl. No.: 109,833

[30] Foreign Application Priority Data
Mar. 3, 1970 France .............................. 7003679

[52] U.S. Cl. ............................... 267/141, 267/63 R
[51] Int. Cl. ........................................... F16f 7/12
[58] Field of Search ...................... 267/35, 63, 141

[56] References Cited
UNITED STATES PATENTS
2,724,588  11/1955  Sheets ................................. 267/63
FOREIGN PATENTS OR APPLICATIONS
672,420  10/1964  Italy .................................... 267/63

Primary Examiner—James B. Marbert
Attorney—Marks, Clerk & John Lezdey

[57] ABSTRACT

Damper for damping shocks and vibrations between elements comprising an elastically yieldable supporting membrane bearing on the base wall of a housing, an elastically yieldable opposing membrane and a piston cooperating with the two membranes and adapted to be connected to another of the elements. At least one additional elastically yieldable membrane having a stiffened periphery is mounted in the housing to slide therein between the supporting membrane and the opposing membrane.

11 Claims, 4 Drawing Figures

SHOCK AND VIBRATION DAMPER

The present invention relates to dampers or absorbers of shocks and vibrations between two structures or members.

Devices for damping or absorbing shocks and vibrations are known which mainly comprise, inside a metal housing, a piston, a deformable membrane, termed a supporting membrane, bearing on the bottom of the housing, and a deformable membrane, termed an opposing membrane, which is either fixed to the piston for example by vulcanization, maintained by the piston in contact with the supporting membrane, or fixed to the outer part of the housing, in which case the piston is disposed between the two membranes.

At least one of the membranes, for example the supporting membrane, has a bell shape.

The supporting membrane usually has its periphery fixed to the bottom of the housing.

Such dampers are described in particular in French Pat. Nos. 1,302,531 and 1,492,211.

A device of this type affords an important damping or absorption of shocks and vibrations, the damping being principally achieved by the mechanical work done in the deformations of the supporting and opposing membranes and by the internal molecular work done in the elastomer mixtures having a high hysteresis employed in the manufacture of these membranes.

However, as the load capacity of such a damper is determined by the dimensions of the supporting membrane and the nature of the elastomers of which it is composed, the range of permissible loads for a given type of damper could be in certain cases too narrow for the contemplated utilization. It is then necessary to change the dampers or be satisfied with less satisfactory results.

An object of the invention is to remedy the aforementioned drawbacks and to provide a damper which, while it affords an effective filtering of the vibrations, enables the violent shocks to be damped with all the desired progressivity within a wide acceptable range of loads.

The invention provides a device for damping shocks and vibrations between two elements, such as structures or members, comprising disposed within a housing capable of being rendered integral with one of the elements, a first elastically yieldable membrane, namely a supporting membrane bearing on the bottom of the housing, a second elastically yieldable membrane, namely an opposing membrane, and a piston which co-operates with the two membranes and is capable of being rendered integral with the second element, wherein the device further comprises at least one additional elastically yieldable membrane which is stiffened on its periphery and slidably mounted in the housing between the supporting membrane and opposing membrane.

According to a particular feature of the invention, the additional membrane has its periphery fixed to an inserted mount slidably mounted in the housing.

Further features and advantages of the invention will be apparent from the ensuing description with reference to the accompanying drawing.

Figure 1:
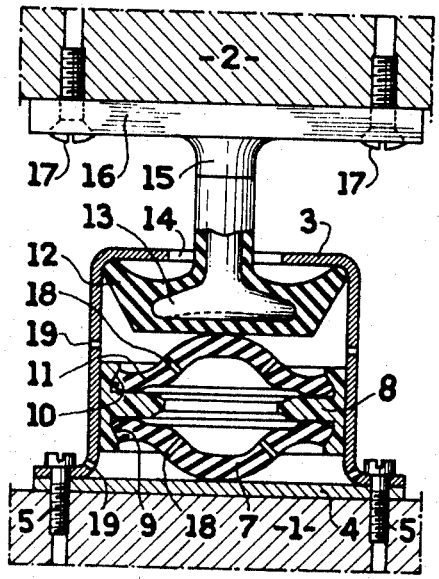
FIGS. 1 and 2 are axial sectional views of two types of dampers according to the invention having one intermediate membrane.

FIG. 1 shows a damper or shock absorber interposed between two structures 1 and 2 so as attenuate the shocks and vibrations transmitted therebetween. The damper comprises a housing 3 which is pressed-metal structure having a generally cylindrical shape and rendered integral with a base 4 by screwing, riveting or forming over.

The base 4 is fixed by screws 5 to the structure 1. In the vicinity of the base 4, the housing 3 has on its periphery a rounded portion 6.

An elastically yieldable bell-shaped membrane 7, termed a supporting membrane, is disposed in the housing 3 in such manner that its apex is in contact with the base 4.

The membrane 7 is secured by its peripheral edge to an interposed mount 8 in the form of a ring of plastics material, as that known under the name of Nylon, and slidably mounted in the housing 3. For this purpose, the peripheral edge of the membrane 7 is maintained either by wedging or by adhesion in a first groove 9 formed in a part of the ring 8 adjacent the base 4. In order to increase the rigidity of the ring 8, the latter can comprise in its center part a web provided with an aperture of small diameter so that the ring does not compress air in the housing when it moves.

Formed in a part of the ring 8 remote from the base 4 is a second groove 10 similar to the groove 9 in which is engaged in the same manner the peripheral edge of an intermediate elastically yieldable membrane 11 whose apex is in contact with a layer 12 of elastomer material on a piston 13 whose rod 15 extends through the housing 3 by way of a bore 14 and has at its end remote from the piston 13 a reinforcement 16. The latter is secured to the structure 2 by screws 17. The layer 12 on the piston 13 constitutes the opposing membrane of the damper.

The membranes 7 and 11 are provided with one or more apertures 18 of small diameter and the lateral wall of the housing 3 is provided with orifices 19 so as to put the interior of the latter in communication with the atmosphere and thus preclude any pneumatic effect on the operation of the damper.

It is known that the effectiveness of known dampers is closely related to the exact adaptation of the supporting membrane to the force to which it is to be subjected.

The crush resistance of the membrane under the nominal load of the damper must be advantageously so chosen as to be within the part of the static deflection curve whose tangent makes a minimum angle with the axis of the abscissae.

The section of the curve just defined corresponds to a given range of loads outside which the damping conditions cease to be the best.

The damper according to the invention affords an effective solution to this problem, by a judicious choice of the crush resistances of the membranes in its design.

As concerns the damper shown in FIG. 1, the crush resistance of the membrane 11 is so chosen as to correspond to the minimum load that the damper must support in operation.

The crush resistance of the supporting membrane 7 is so chosen that it operates under the best conditions under a load which exceeds the capacity of the membrane 11.

Figure 2:
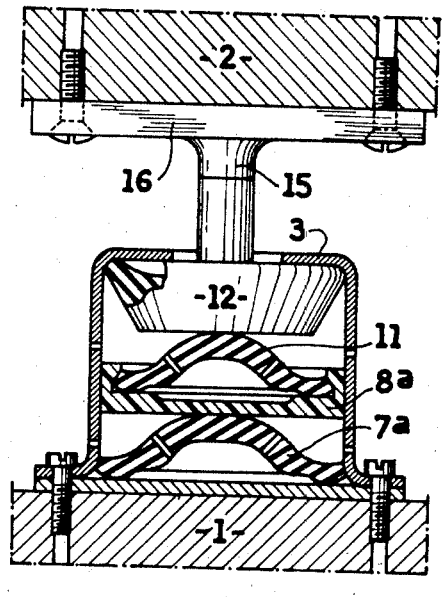

A modification of the damper shown in FIG. 1 is shown in FIG. 2 in which it can be seen that the supporting membrane 7a bears on the base 4 not by its apex but by its peripheral edge, the rounded portion 6 of the housing 3 being in this case adapted to facilitate a wedging of the peripheral edge of the membrane 7a.

Moreover, the mount 8a is in the form of a disc and has only one annular groove 10a adapted to receive the intermediate elastically yieldable membrane 11. The face of the mount 8a facing the base 4 is plane so as to be capable of bearing against the apex of the supporting membrane 7a.

Figure 3:
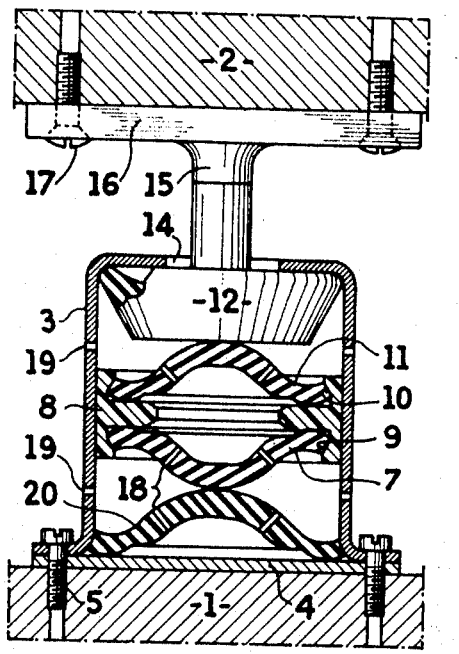
FIG. 3 is an axial sectional view of a damper according to the invention having two intermediate membranes.

The damper shown in FIG. 3 is of the type having two intermediate membranes. This damper has a construction somewhat similar to that of the device shown in FIG. 1. The membrane 7 is no longer the supporting membrane, this function being fulfilled by an additional bell-shaped membrane 20 mounted in the housing 3 in the same way as the membrane 7a of the damper shown in FIG. 2. In this modification, the membranes 7 and 11 have their peripheral edges secured to the ring 8 and move with the latter, whereas apices of the membranes 7 and 20 bear against each other.

Figure 4:
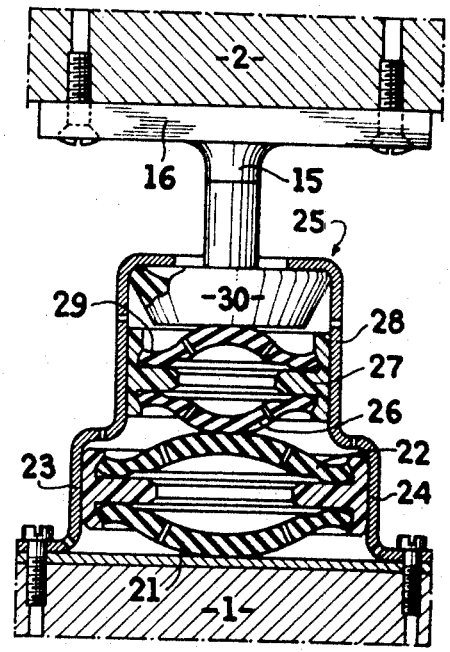
FIG. 4 is an axial sectional view of a damper according to the invention having two interposed mounts.

FIG. 4 shows a damper having two interposed rings or mounts and three intermediate membranes. Two elastically yieldable bell-shaped membranes 21 and 22 are secured in a mount 23 in the form of a ring slidably mounted in a part 24 of the housing 25 of the damper.

The apex of the supporting membrane 21 bears against the base 26 and the apex of the membrane 22 is in contact with a third membrane 26 which is secured to a mount 27 in the form of a ring slidably mounted in a narrower part 28 of the housing 25.

A fourth membrane 29, in contact with the piston 30 of the damper, is secured to the upper part of the ring 27.

The stepped shape of the housing 25 is of interest in that it permits introducing in its upper art the membranes 21, 22 of larger diameter and greater thickness which are capable of supporting greater loads than the membranes 26, 27.

However, for certain utilizations, the housing can have a constant section throughout its length and contain a plurality of interposed mounts having the same diameter, each mount being combined with two intermediate membranes. These intermediate membranes can be identical or have crush resistances which increase in the direction in which the damper is intended to support progressively higher and higher loads.

If the membranes are identical, the damper is adapted to work under constant load.

If the membranes have a progressive crush resistance, the damper can work under a progressive load.

In both cases such a construction provides a damper having a long travel.

The damper described with reference to FIG. 1 operates in the following manner:

When the rod 15 of the damper is subjected on the part of the structure 2 to a load m, compatible with the crush resistance of the membrane 11, the latter operates under the best conditions and affords optimum damping.

As the membrane 7 is only slightly stressed it affords only a complementary damping which is small with respect to that afforded by the membrane 11. When the load exerted on the rod 15 increases and reaches for example 2 m, the membrane 11 operates under inferior conditions, whereas the effect of the membrane 7 increases.

Finally, for a higher load, for example 3 m, the membrane 7 affords the normal damping corresponding to this load, whereas the membrane 11 now only affords an additional damping.

Thus, it can be seen that it is possible to obtain a maximum damping curve for a very large range of loads whereas such a result is impossible with a known damper.

It will be understood that the same reasoning is applicable to a damper such as that shown in FIG. 3, which comprises three membranes or any other modification of the damper according to the invention.

If there is employed a damper having an interposed ring or mount combined with two identical membranes, the results correspond to the connection in series of two dampers of known type.

Such an arrangement affords the following advantages:

a. Reduction in the frequency of resonance of the damper.

b. Increase in the possible travel of the piston of the damper before solid abutment, this increase allowing a greater dissipation of energy when the damper is compressed and thus resulting in an improved damping of the shocks.

If a damper having three membranes is employed, its frequency of resonance is still further reduced and its shock-damping capacity is still further increased.

The range of possible loads is also widened so that the damper can be effectively employed in a very wide range of applications.

Having now described my invention what I claim and desire to secure by Letters Patent is:

1. A damper for damping shocks and vibrations between two elements, comprising means defining a housing having a base wall and adapted to be connected to one of said elements, an elastically yieldable bell-shaped supporting membrane bearing on said base wall, an opposing bell-shaped membrane, a piston in cooperative relation to the two membranes and adapted to be connected to another of said elements, and an additional elastically yieldable bell-shaped membrane having a stiffened peripheral portion and slidable in said housing between said supporting membrane and said opposing membrane, the interior of said housing being in communication with the atmosphere.

2. A damper as claimed in claim 1, comprising an interposed mount slidably mounted in said housing, said additional membrane having said peripheral portion secured to said interposed mount.

3. A damper as claimed in claim 1, wherein said supporting membrane has an apex portion in contact with said base wall and means secure said peripheral portion of said additional membrane to a peripheral portion of said supporting membrane.

4. A damper as claimed in claim 1, comprising an interposed mount slidably mounted in said housing, said supporting membrane having an apex portion in contact with said base wall, said peripheral portion of said supporting membrane being engaged in an annular groove in said mount so as to be secured to said mount, and said peripheral portion of said additional membrane being engaged in another annular groove in said mount so as to be secured to said mount.

5. A damper as claimed in claim 4, wherein said mount comprises a ring.

6. A damper as claimed in claim 2, wherein said supporting membrane has a peripheral portion in contact with said base wall, said mount comprising a disc having a first plane face and a second plane face, and said supporting membrane having an apex portion bearing against said plane face, said second plane face having a groove in which said periphery of said additional membrane is engaged.

7. A damper as claimed in claim 2, wherein said supporting membrane has a peripheral portion in contact with said base wall and said mount comprises a ring having a first face comprising a first groove and a second face comprising a second groove, said peripheral portion of said additional membrane being secured in said first groove, a further bell-shaped additional membrane having a peripheral portion secured in said second groove.

8. A damper as claimed in claim 2, wherein said housing comprises a plurality of interposed mounts, each mount being secured to a pair of bell-shaped membranes.

9. A damper as claimed in claim 8, wherein said mounts have identical sizes in transverse planes of said housing.

10. A damper as claimed in claim 8, wherein said mounts have different sizes in transverse planes of said housing and said housing has a stepped form and comprises portions of different sizes in which said mounts of different sizes are slidably mounted.

11. A damper for damping shocks and vibrations between two elements, comprising means defining a housing having a base wall and adapted to be connected to one of said elements, an elastically yieldable supporting bell-shaped membrane bearing on said base wall, an opposing bell-shaped membrane, a piston in cooperative relation to the two membranes and adapted to be connected to another of said elements, a plurality of elastically yieldable additional bell-shaped membranes having peripheral portions and means combined with said peripheral portions for stiffening said peripheral portions, said additional membranes being slidable in said housing between said supporting membrane and said opposing membrane.

* * * * *